(12) United States Patent
Skirmont et al.

(10) Patent No.: US 8,161,332 B2
(45) Date of Patent: Apr. 17, 2012

(54) PLUGGABLE TRANSCEIVER MODULE WITH ENHANCED CIRCUITRY

(75) Inventors: David Aaron Skirmont, Los Gatos, CA (US); Daniel Kiernan Kilkenny, Pleasanton, CA (US); Surya Parkash Varanasi, Dublin, CA (US); Kung-Ling Ko, Union City, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 133 days.

(21) Appl. No.: 12/609,929

(22) Filed: Oct. 30, 2009

(65) Prior Publication Data

US 2011/0066909 A1   Mar. 17, 2011

Related U.S. Application Data

(60) Provisional application No. 61/242,759, filed on Sep. 15, 2009.

(51) Int. Cl.
*G06F 11/00* (2006.01)

(52) U.S. Cl. ........................................ 714/704

(58) Field of Classification Search ........................ None
See application file for complete search history.

(56) References Cited

U.S. PATENT DOCUMENTS

| | | | | |
|---|---|---|---|---|
| 6,501,582 | B2* | 12/2002 | Chiou et al. | 398/126 |
| 6,583,662 | B1* | 6/2003 | Lim | 327/553 |
| 2004/0088574 | A1* | 5/2004 | Walter et al. | 713/201 |
| 2004/0110468 | A1* | 6/2004 | Perlman | 455/13.3 |
| 2005/0049976 | A1* | 3/2005 | Yang | 705/67 |
| 2006/0034481 | A1* | 2/2006 | Barzegar et al. | 381/401 |
| 2007/0180145 | A1* | 8/2007 | Scheibe | 709/246 |
| 2008/0172708 | A1* | 7/2008 | Perry et al. | 725/110 |

OTHER PUBLICATIONS

SFF Committee, SFF-8431 Specifications for Enhanced Small Form Factor Pluggable Module SFP+, Revision 4.1, Jul. 6, 2009, pp. i-118.
SFF Committee, SFF-8432 Specification for Improved Pluggable Formfactor, Revision 5.0, Jul. 6, 2007, pp. 1-17.
SFF Committee, INF-8077i 10 Gigabit Small Form Factor Pluggable Module, Revision 4.5, Aug. 31, 2005, pp. i-168.
Maxim Integrated Products, Application Note 4222, DS1863; D51865; DS1875: How to Interface to MAX3736 Compact Laser Driver, Jun. 6, 2008, p. 1-3.
Avago Technologies, Data Sheet, AFBR-57D7APZ Digital Diagnostic SFP, 850 nm, 8.5/4.25/2.125 GBd Low Voltage (3.3 V) Fibre Channel RoHS Compliant Optical Transceiver, Dec. 5, 2008, pp. 1-19.

(Continued)

*Primary Examiner* — Guerrier Merant
(74) *Attorney, Agent, or Firm* — Wong, Cabello, Lutsch, Rutherford & Brucculeri, LLP

(57) ABSTRACT

Pluggable transceiver modules with additional functions and circuitry contained within the module. In a first embodiment, additional circuitry is added to determine bit error rates at the point of the module itself. This allows a much better diagnostic evaluation of location of problem. In an alternate embodiment, various logic is placed in the module. In a first alternate embodiment encryption/decryption units are placed in the converter module so that encryption and decryption operations on the serial bitstream do not need to be performed in a switch. Existing switches can be used but the interconnecting links can still be encrypted. A second alternate embodiment includes compression/decompression units placed in the module to allow effective higher throughput on the selected links.

10 Claims, 6 Drawing Sheets

OTHER PUBLICATIONS

Maxim Integrated Products, Data Sheet, DS1859 Dual, Temperature-Controlled Resistors with Internally Calibrated Monitors, Rev. 4, Feb. 2006, pp. 1-28.
Maxim Integrated Products, Data Sheet, DS1875 PON Triplexer and SFP Controller, Rev. 1, Oct. 2008, pp. 1-92.
Maxim Integrated Products, Data Sheet, MAX3736 3.2Gbps, Low-Power, Compact, SFP Laser Driver, Rev. 2, Sep. 2010, pp. 1-11.
Maxim Integrated Products, 4-Pin ROSA Diagram, 2009, p. 1.
Maxim Integrated Products, 5-Pin ROSA with RSSI, 209, p. 1.
Maxim Integrated Products, SFF/SFP Overview, 2009, p. 1.

* cited by examiner

PLUGGABLE TRANSCEIVER MODULE WITH ENHANCED CIRCUITRY

CROSS REFERENCE TO RELATED APPLICATIONS

This application claims the benefit under 35 U.S.C. §119(e) of U.S. Provisional Patent Application Ser. No. 61/242,759 entitled "OPTICAL TRANSCEIVER MODULE WITH ENHANCED CIRCUITRY," filed Sep. 15, 2009, which is hereby incorporated by reference.

BACKGROUND OF THE INVENTION

1. Field of the Invention

The invention relates to pluggable transceiver modules used to connect serial cables to electronic components.

2. Description of the Related Art

In high speed communications today the most common communication media are fiber optic cables. Various switches, routers and the like are electronic devices which form the various networks. An electro-optical converter or transceiver is necessary to convert between the light on the fiber optic cables and the electronic signals in the various devices. For ease of use and interoperability, standards have been developed such as the SFP or SFP+ specifications for the transceiver modules. Because they are standardized, SFP and SFP+ modules are available from multiple vendors. In general, an SFP or SFP+ module performs the optical electrical conversions with various detectors, amplifiers and emitters necessary to perform the desired function. The control elements inside the modules are just those necessary to perform the conversion functions, such as variable resisters to use to control amplifier gains and the like.

At the high communication speeds today, such as 10 Gb/s, it has become very difficult to detect and debug errors. This is aggravated by the fact that modules such as SFP modules provide only rudimentary diagnostic outputs, such as transmit faults and loss of signal. Therefore it is common when errors are being detected to replace first the module and then the particular circuit board that contains the module, potentially at both the transmitting and receiving ends. As a result, diagnostics relating to errors are very time consuming and prolonged as it requires effectively blindly replacing modules and components until the problem is fixed.

In addition, various new techniques, such as encryption and compression on particular links, are desired but to provide those capabilities, new switches and the like must be purchased and installed, resulting on large costs to employ the techniques. It would be desirable to be able to use existing switches and the like and still use the newer techniques.

SUMMARY OF THE INVENTION

Pluggable transceiver modules according to the present invention have additional functions and circuitry contained within the module beyond the simple pluggable transceiver functions. In a first embodiment, additional circuitry is added to determine bit error rates at the point of the module itself. When utilized in conjunction with bit error rate monitoring at the electronics on the particular board, this allows a much better diagnostic evaluation of location of problem. If the receiver bit error rate monitor in the module is giving a high error rate, then the transmitting board, a transmitter or receiver module or the cable is suspect. If the transmitting module indicates a low bit error rate, the transmitter board is removed from the list. If the receive module is providing a low-bit error rate indication but the receive circuitry on the board is providing a high error rate, this is an indication that the circuit board itself is failing and not the particular module. If the transmitter module is indicating a high error rate, then focus can shift to the transmit end. Therefore diagnostics are greatly improved.

In an alternate embodiment according the present invention, various logic is placed in the module in addition again to the conversion capabilities. For example in first alternate embodiment encryption/decryption units are placed in the converter module so that encryption and decryption operations on the serial bitstream do not need to be performed in a switch or the like but can be offloaded to the module. Further, by placing this capability in the module existing switches can be used but the interconnecting links can still be encrypted.

A second alternate embodiment includes compression/decompression units placed in the module to allow effective higher throughput on the selected links. Again, this can be done with existing switches and the like, without having to purchase new devices.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1:
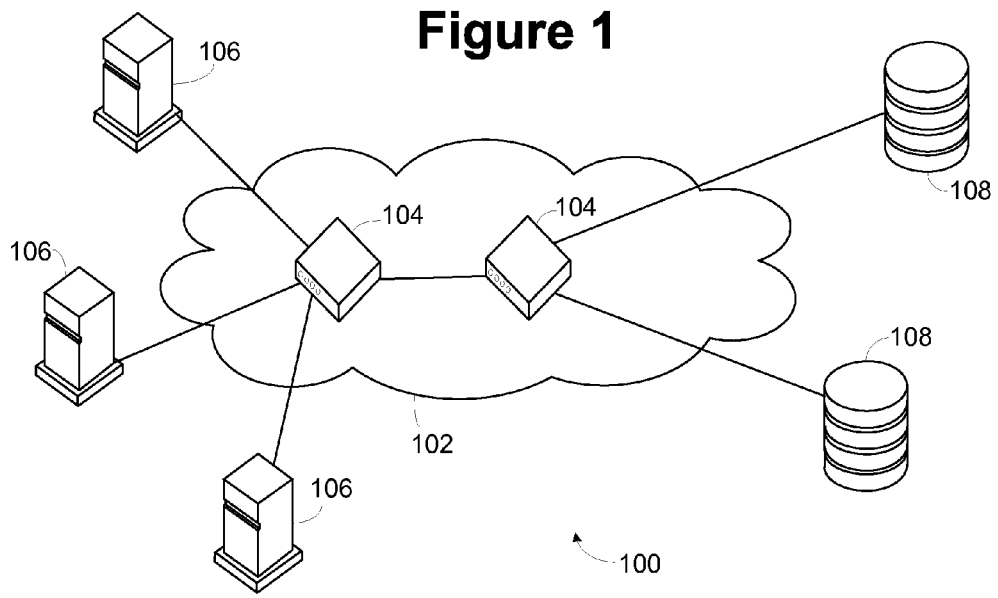
FIG. 1 illustrates a network according to the present invention.

Referring now to FIG. 1, a network 100 generally according to the present invention is shown. The illustrated embodiment is a Fibre Channel storage network but could readily be an Ethernet network or any other network that uses modular pluggable transceiver units. A fabric 102 is formed from a series of switches 104. Various devices such as hosts 106 and storage units 108 are connected to the switches 104. In an exemplary embodiment the links connecting the servers or hosts 106 to the switches 104 are 8 Gb/s Fibre Channel links while the other links to the storage units 108 could be 8 Gb/s or 4 Gb/s. The links between the switches 104 would preferably be 8 Gb/s links, preferably trunked for increased throughput. In an Ethernet environment, the links could be 1 Gb/s optical links or they could be 10 Gb/s optical links.

Figure 2:
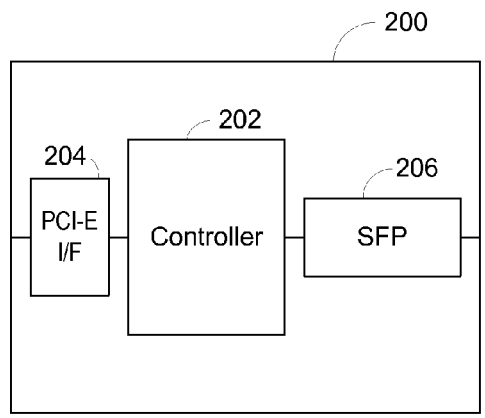
FIG. 2 illustrates a plug-in card to go into the servers or the storage units of FIG. 1.

FIG. 2 is a block diagram of an interface card 200 which would be present in devices such as the host 106 and the storage units 108. In Fibre Channel, the cards 200 are called HBAs or host bust adapters. For Ethernet the cards 200 are called network interface cards (NICs) or converged network adapters (CNAs). The card 200 includes a controller 202 which performs the primary functions, such as the HBA functions for Fibre Channel or the network functions for Ethernet. A PCI-E interface 204 is connected to the controller 202 to allow interconnection to a PCI-E link in either the host 106 or the storage unit 108. Other interfaces in the host could also be used, such as processor links, PCI bus and the like. An SFP unit 206 is also connected to the controller 202. The SFP unit 206 is actually multiple parts consisting of an electro-optical transceiver module, such as those in the prior art or according to the present invention and a cage to receive the module. This is only a single illustrated design and other interfaces to the hosts 106 and storage units 108 could be utilized and different controllers could be utilized. Further, electro-optical or copper transceiver modules other than SFPs, such as XFP, XEN-PAK, X2, QSFP, CXP and CFP and the like, could be utilized. SFP is used in this description as exemplary.

Figure 3:
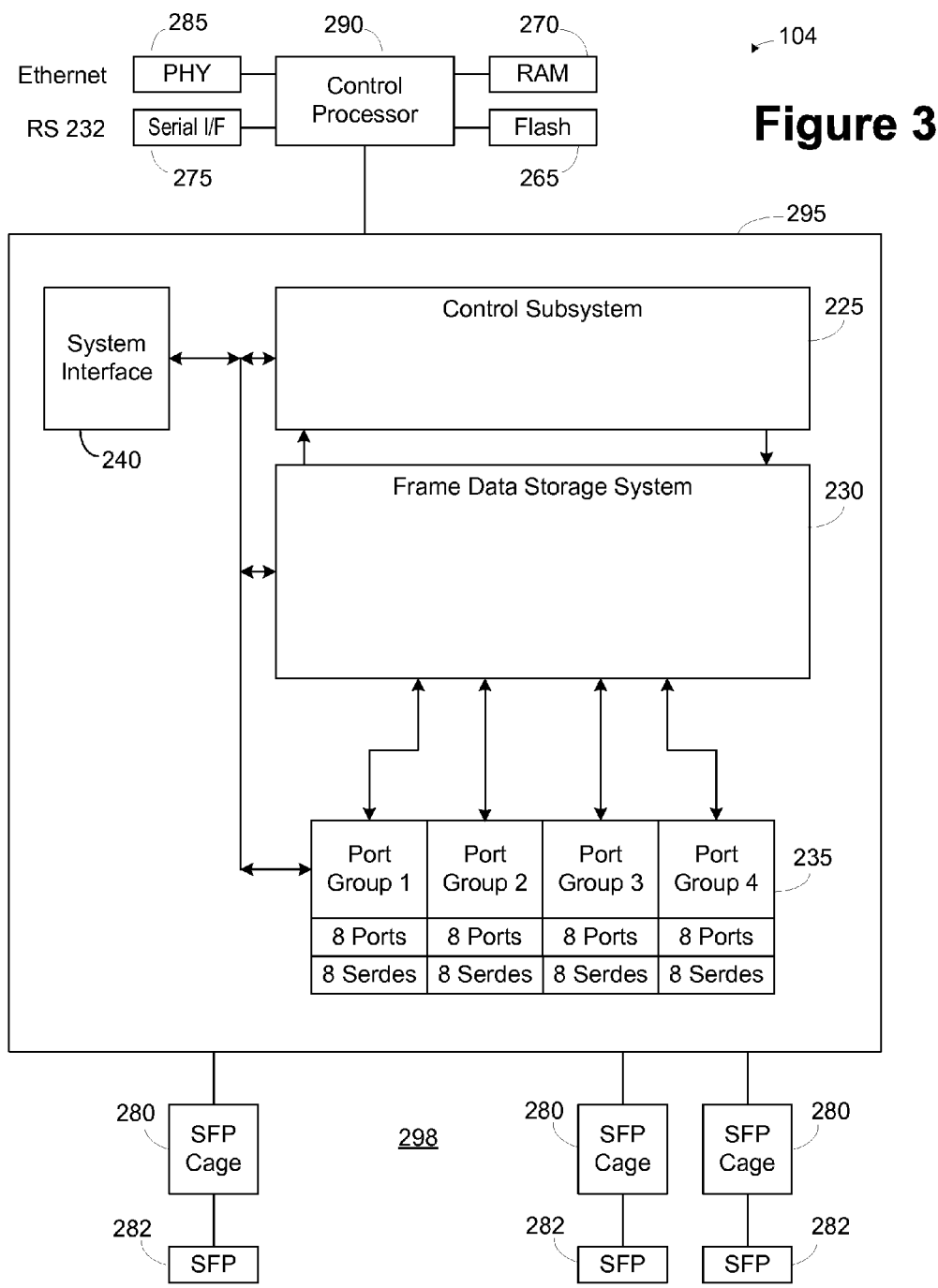
FIG. 3 is a block diagram of a networking device located in the fabric of FIG. 1.

Referring now to FIG. 3, this is a block diagram of an exemplary switch 104 according to the preferred embodiment. A control processor 290 is connected to a switch ASIC 295. The switch ASIC 295 is connected to SFP cages 280 which receive SFP modules 282. Generally the control processor 290 configures the switch ASIC 295 and handles higher level switch 104 operations, such as the name server, the redirection requests, and the like. The switch ASIC 295 handles the general high speed inline or in-band operations, such as switching, routing and frame translation. The control processor 290 is connected to flash memory 265 to hold the software, to RAM 270 for working memory and to an Ethernet PHY 285 and serial interface 275 for out-of-band management.

The switch ASIC 295 has four basic modules: port groups 235, a frame data storage system 230, a control subsystem 225 and a system interface 240. The port groups 235 perform the lowest level of packet transmission and reception and include the ports themselves and a serdes for each port. Generally, frames are received from the SFP modules 282 and provided to the frame data storage system 230 through a port on a port group 235. Further, frames are received from the frame data storage system 230 and provided from a port for transmission out an SFP module 282. The frame data storage system 230 provides initial portions of each frame, typically the frame header and a payload header for FCP frames, to the control subsystem 225. The control subsystem 225 has translate, router, filter and queuing blocks (not shown). The translate block examines the frame header and performs any necessary address translations, such as those which will happen when a frame is redirected as described herein. There can be various embodiments of the translation block, with examples of translation operation provided in U.S. patent application Ser. No. 10/695,408 and U.S. Pat. No. 7,120,728, both of which are incorporated by reference. Those examples also provide examples of the control/data path splitting of operations. The router block examines the frame header and selects the desired output port for the frame. The filter block examines the frame header, and the payload header in some cases, to determine if the frame should be transmitted. The queuing block schedules the frames for transmission based on various factors including quality of service, priority and the like.

Figure 4:
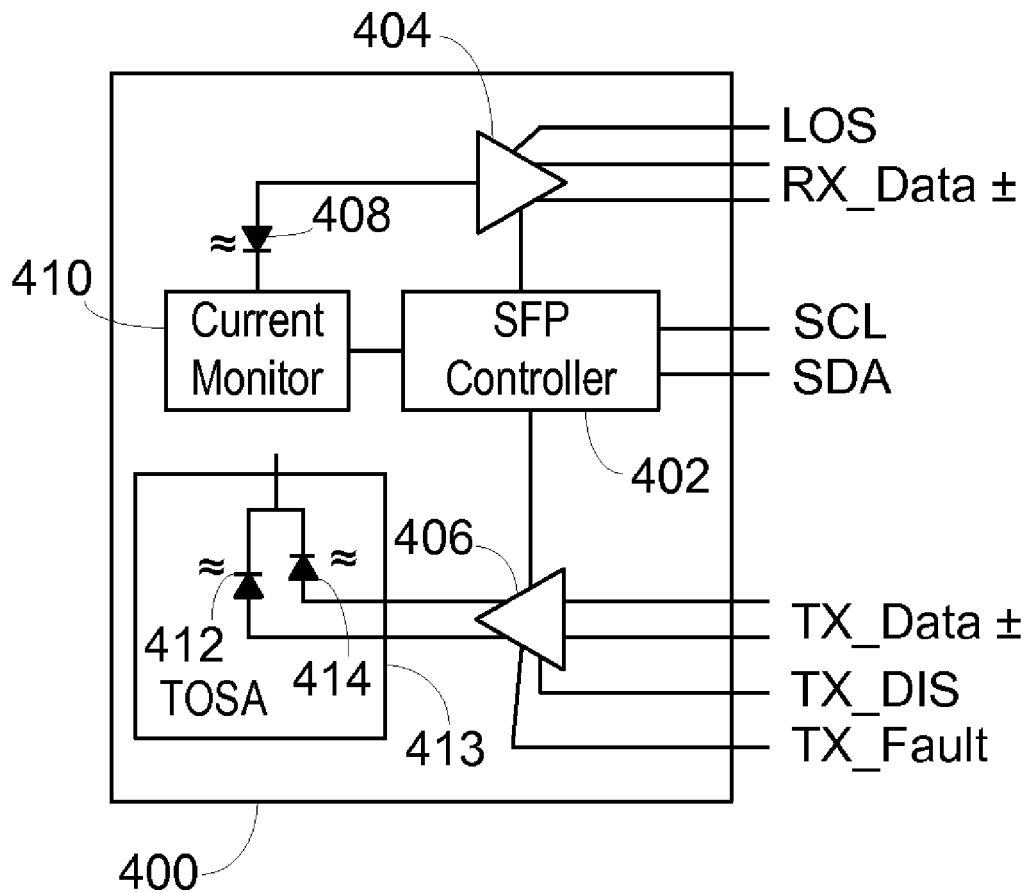
FIG. 4 is a block diagram of a prior art SFP transceiver module.

Referring now to FIG. 4, this is a block diagram of a typical prior art SFP module. The module 400 includes an SFP controller 402 which has an I²C bus interface using the SCL and SDA signals which are common in the industry. In other pluggable transceiver modules other interfaces could be used. I²C is exemplary. The SFP controller 402 cooperates with a receive amplifier 404 to set the receive amplification limits and digital conversions and with a transmitter amplifier 406 to control the digital conversions and amplification limits of the transmitter amplifier. The receive amplifier 404 has an input from a photodetector 408, which is also connected to a current monitor 410, which is then interconnected to the SFP controller 402. The output of the receive amplifier 404 in this block diagram is a loss of signal (LOS) signal to indicate that there is no incoming light and the plus and minus or balanced signals for the RX_Data or receive data. The input to the transmitter amplifier 406 includes the balanced TX_Data or transmit data signals and a transmit disable TX_DIS signal to disable transmission. Outputs of the transmitter amplifier 406, commonly referred to as a laser driver if an optical output is being provided, include a TX_Fault signal to indicate an error in the transmitter circuitry and a signal, either single ended or balanced, provided to a transmission optical sub-assembly (TOSA) or vertical-cavity surface-emitting laser (VCSEL) 413. The TOSA 413 generally includes one laser diode 412 and one photodiode 414. The photodiode 414 is used to monitor the laser diode 412. Not shown in FIG. 4 are the actual electrical, optical and mechanical connectors. Reference is requested to the SFF Committee website at www.s-ffcommitte.com for further details on various standards, including SFP and SFP+. As can be seen from the block diagram, there is very limited diagnostic capability, namely loss of signal and transmit fault. As these are very gross functions, they do not indicate or assist in providing anything other gross level diagnostics for the SFP module or the link.

Figure 5:
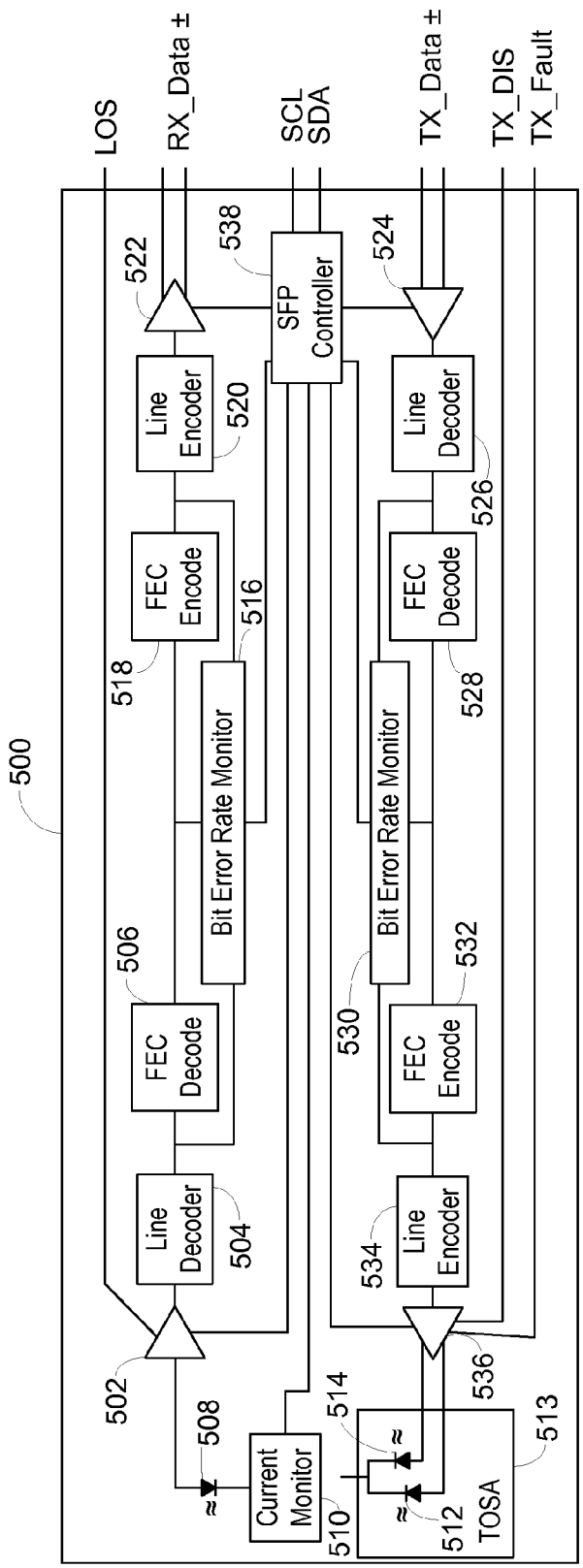
FIG. 5 is a block diagram of a first embodiment of an SFP transceiver module according to the present invention.

FIG. 5 illustrates a first embodiment according to the present invention of an enhanced SFP module 500. The module 500 has similar photo detector 508 and emitter diodes 512 and 514 and a similar current monitor 510 as in the prior art module 400. In the receive path a first receive amplifier 502 is present. Outputs of this first receive amplifier 502 include the LOS signal previously present and an output to a line decoder circuit 504, which is used to descramble the received binary signal. 10 Gb/s Ethernet and 16 Gb/s Fibre Channel are encoded using a 64/66 bit scheme, while 8 Gb/s Fibre Channel is encoded using an 8/10 bit scheme. The output of the line decoder circuit 504 is provided to a forward error correction (FEC) decode circuit 506. Forward error correction is utilized on the link to help determine and detect and correct errors which may occur. An exemplary FEC technique is disclosed in IEEE 802.3-2009, Clause 74, which is hereby incorporated by reference. Similar techniques can be used with 8/10 bit encoding. A bit error rate (BER) monitor circuit 516 is connected to the output of the FEC decode circuit 506. The bit error rate monitor circuit 516 monitors and detects the various errors that are coming out of the FEC decode circuitry 506 to determine error rates that are present. The output of the FEC decode circuit 506 is also provided to an FEC encode circuit 518 whose output is provided to a line encoder circuit 520, which is effectively the inverse of the line decoder circuit 504. The output of the line encoder circuit 520 is provided to a driver 522 which provides the balanced RX_Data signal present on a conventional SFP module. By utilizing the line decoder circuit 504 and FEC decode circuit 506 and complementary FEC encode circuit 518 and line encoder circuit 520 the SFP receive circuitry in the module 500 can be transparently inserted in link that is performing FEC decode at a later stage without any additional changes to the normal receive circuit on the switch. If no FEC encoding is being used on the link normally, the FEC encode circuit 518 and line encoder circuit 520 can be bypassed or omitted.

While use with FEC is preferred, an alternate embodiment can further or alternatively monitor bit error rates before the FEC decode circuitry 506 and after the FEC encode circuitry 518 as also shown in FIG. 5. This can provide a more accurate bit error rate without the correction effects of the FEC. This non-FEC monitoring can be done based on illegal or improper codes in the 66 bit or 10 bit streams. By monitoring after the FEC encode circuitry 518, errors introduced inside the module 500 can be detected separately from errors received at the card or switch into which the module 500 is plugged.

The transmit path is similarly enhanced. The TX_Data signals are provided to an input buffer 524 whose output is provided to a line decoder circuit 526 and then to an FEC decode circuit 528. A bit error rate monitor 530 is connected to the output of the FEC decode circuit 528. An FEC encode circuit 532 is connected to the FEC decode circuit 528. The output of the FEC encode circuit 532 is provided to a complementary line encoder circuit 534 whose outputs are provided to a transmit amplifier or laser driver 536 similar to the one conventionally used to drive the laser diode 512 in the TOSA 513, with the photodiode 514 providing feedback to the transmit amplifier 536. The TX_DIS signal is provided to the amplifier 536 and the TX_Fault signal is provided from the amplifier 536 as normal.

An enhanced SFP controller 538 is present. The enhanced SFP controller 538 receives I²C signals SCL and SDA as conventional and is also connected to the various amplifiers 502, 522, 524 and 536 and receives indications from the current monitor 510. The enhanced SFP controller 538 is also connected to the line encoders 520, 534 and line decoders 504, 526 to provide the proper line encoding technique, either 64/66 bit or 8/10 bit based on signals provided from the system or main controller. In addition, the SFP controller 538 is connected to the bit error rate monitors 516 and 530 to provide access and feedback from the error diagnostics occurring in the module 500. As the module 500 contains new capabilities, identifier bits are provided in the enhanced SFP controller 538 so that the HBAs, NICs or switches can detect the enhanced SFP controller 538 with the bit error rate monitoring capability and thus utilize the diagnostic capabilities of the SFP 500. If desired, the controller 538 can also be connected to disable or bypass the FEC encode circuit 518, line encoder circuit 520, line decoder circuit 526, FEC decode circuit 528 and bit error rate monitor 530.

To use the module 500, the general or main controller for the receiving device detects the module 500 and determines the improved diagnostics capabilities. When errors are detected, the main controller can then monitor the BER monitor circuit 516 and a BER monitor circuit located on the receiving device. The bit error rates can then be provided to an administrator for diagnostic purposes. This provision of the bit error rates will indicate whether the errors are present in the received bit stream or developed by the receive amplifier 502 or whether the errors are occurring after the module 500 in the circuit board of the receiving device. This can isolate an error to either the module 500 or the circuit board without the trial and error previously used. If the receiving device can communicate with the transmitting device and the transmitting device includes a similar module 500, the output of the BER monitor circuit 530 at the transmitter can be provided to further isolate the errors to the transmitting circuit board, transmitting module 500 or the fiber optic cable, thus even further reducing the trial and error diagnostic method.

Figure 6:
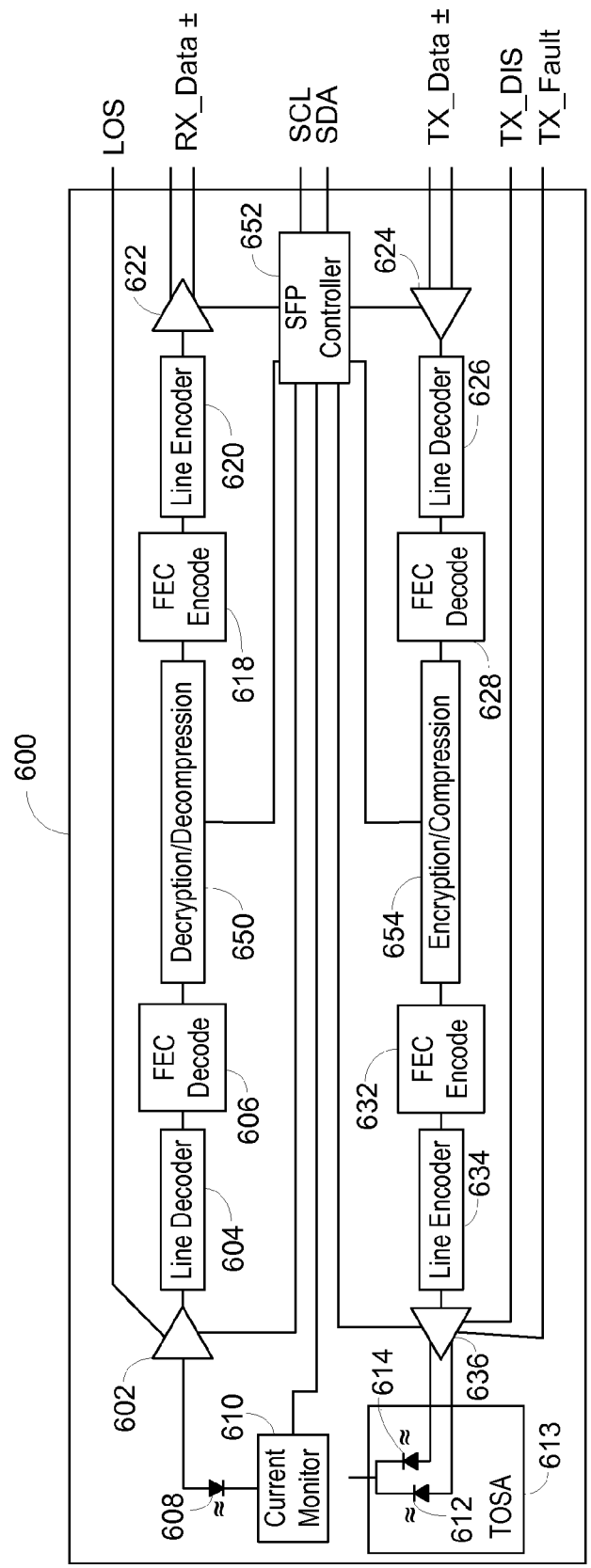
FIG. 6 is a block diagram of a second embodiment of an SFP module according to the present invention.

An alternative enhanced SFP module 600 is illustrated in FIG. 6. Components which are similar to those in the module 500 have like numbers except that the first digit has been changed from a "5" to a "6." This includes for example the amplifiers, the line decoder and line encoder circuits, the FEC decode and encode circuits. In the module 600, located between the FEC decode circuit 606 and the FEC encode circuit 618 is a decryption and/or decompression circuit 650. In one embodiment this is decryption circuitry, in an alternative embodiment it is decompression circuitry and in a third embodiment it is both decryption and decompression circuitry, depending upon the functions desired for the particular module. If encryption is being used, an enhanced SFP controller 652 receives a decryption key which is utilized for the particular link. This decryption key is provided from the SFP controller 652 to the decryption module 650 in that embodiment to allow decryption of the secured link connected to the module 600. The output of the decrypted unit 650 is provided through the FEC encode circuit 618. Alternatively, if a compressed link is utilized, compression circuit 650 is utilized in that embodiment with activation provided by the SFP controller 652 based on commands received from the main controller. On the transmission side, complementary encryption/compression circuitry 654 is present. This will utilize the key provided to the SFP controller 652 for the particular link or the activation of the compression circuitry. In this matter when a like module 600 is utilized at the other end of the particular link, encryption and/or compression can be utilized without any circuitry changes to the transmitting and receiving devices. The controllers on the transmitting and receive devices must be able to detect the new capabilities of the modules and provide the keys or activate the compression in coordination with the device at the other end of the link. Generally those functions of the device controllers can be provided by a firmware or software upgrade without any need to change any hardware on the devices. In this manner a user or administrator can select to encrypt or compress particular links as desired without purchasing new devices. Thus, link level encryption and/or compression can be readily retrofitted, only requiring that the controller circuitry on the particular device recognize the enhanced capabilities provided by the modules and thus properly communicate with the SFP controller 652.

It is understood that the modules 500 and 600 would include the capabilities to work with varying protocols, such as 8 and 16 Gb/s Fibre Channel and 10 Gb/s Ethernet, so that the enhanced circuits, such as the line encoder and line decoder circuits, FEC encode and decode circuits, BER monitors, and encryption/compression and decryption/decompression circuits would be programmable via the SFP controller to operate with the particular protocol and its framing characteristics and the like.

It is also understood that SFP modules are exemplary and embodiments according to the present invention can be developed for other modules such as XFP, XENPAK, X2, QSFP, CXP and CFP and the like.

Figure 7:
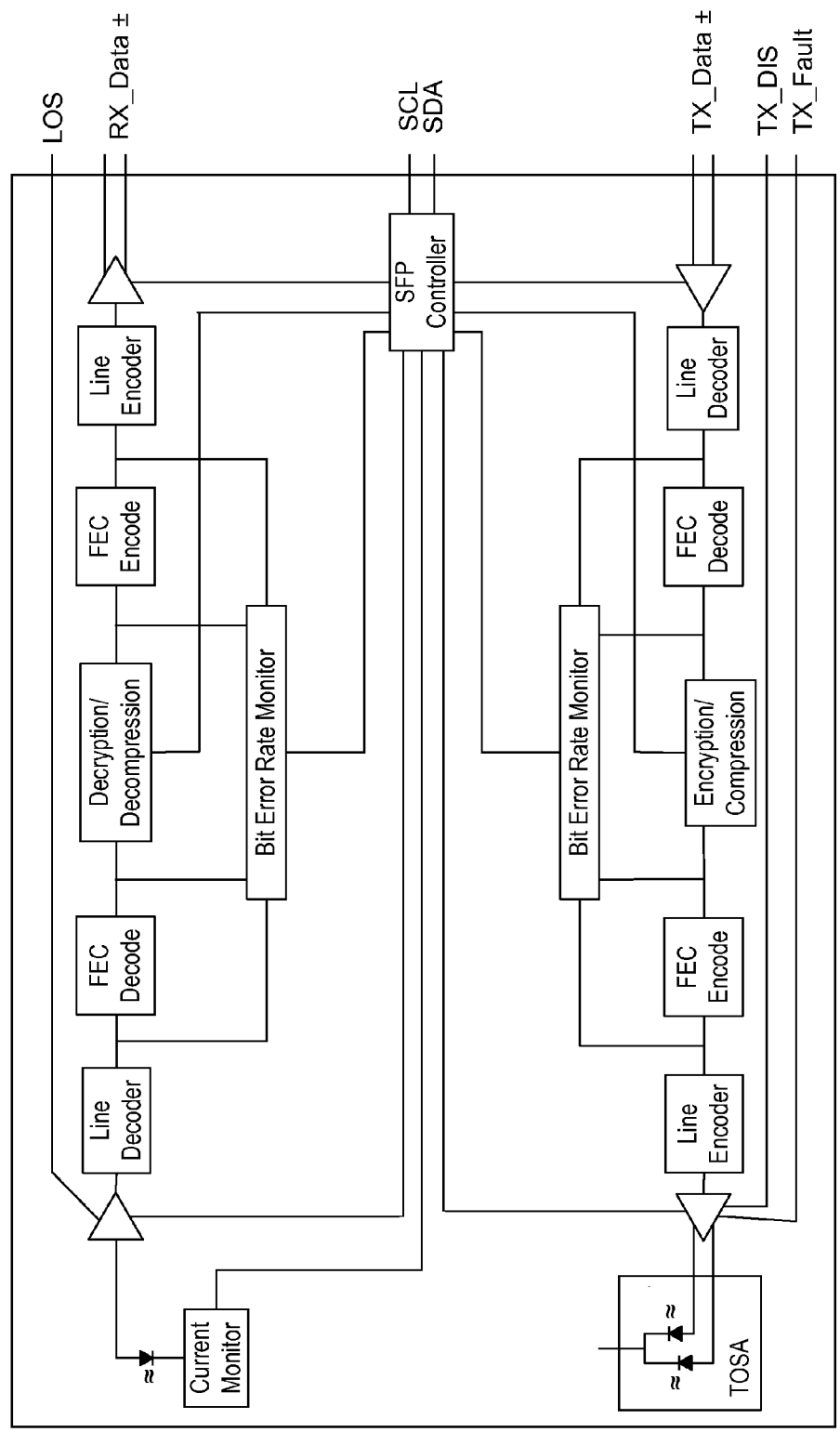
FIG. 7 is a block diagram of a combination of the first and second embodiments of FIGS. 5 and 6.

These are only preferred embodiments of enhanced logic capabilities for pluggable transceiver modules. Other capabilities beyond diagnostics, encryption and compression could be provided in the pluggable module, such as test pattern generation and checking, and signal quality measurements. Further, multiple functions, such as diagnostics and encryption, could be combined in a single module, as shown in FIG. 7.

It is further understood that the various circuits such as amplifiers, buffers and drivers are representative of the functions and various specific circuits could be utilized, such as multiple amplifier circuits and the like to replace a given circuit described in this specification.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A pluggable transceiver comprising:
a receive section including:
receive digital function circuitry configured to decrypt a serial signal;
a receive amplifier having an input coupled to a received signal and having an output digital signal;
a line decoder circuit having an input connected to said receive amplifier output and having an output connected to said receive digital function circuitry;
a balanced output driver having an input and having an output which provides a balanced digital output signal; and
a line encoder circuit having an input connected to the said receive digital function circuitry and having an output connected to said balanced output driver input;
a transmit section including:
transmit digital function circuitry configured to encrypt a serial signal;
a balanced input buffer having an input to receive a balanced digital signal and having an output digital signal;
a line decoder circuit having an input connected to said balanced input buffer output signal and having an output connected to said transmit digital function circuitry;
a transmit amplifier having an input and having an output signal coupled to a transceiver output signal; and
a line encoder circuit having an input connected to said transmit digital function circuitry and having an output connected to said transmit amplifier input; and
a controller having a control communication interface and connected to said receive section and said transmit section,
wherein said controller controls said receive and transmit amplifiers and said receive and transmit digital function circuitry.

2. The pluggable transceiver of claim 1, wherein said receive digital function circuitry is further configured to decompress the serial signal, and wherein said transmit digital function circuitry is further configured to compress the serial signal.

3. The pluggable transceiver of claim 2, wherein said receive digital function circuitry is further configured to configured to monitor bit error rates of the serial signal, and wherein said transmit digital function circuitry is further configured to monitor bit error rates of the serial signal.

4. The pluggable transceiver of claim 1, wherein said receive digital function circuitry further includes:
a photo-detector which provides an output electrical signal based on a received optical signal to the input of said receive amplifier; and
wherein the transmit digital function circuitry further includes:
a laser diode connected to said transmit amplifier output signal and providing an optical output signal.

5. A network device comprising:
a pluggable transceiver including:
a receive section including:
receive digital function circuitry configured to decrypt a serial signal;
a receive amplifier having an input coupled to a received signal and having an output digital signal;
a line decoder circuit having an input connected to said receive amplifier output and having an output connected to said receive digital function circuitry;
a balanced output driver having an input and having an output which provides a balanced digital output signal; and
a line encoder circuit having an input connected to the said receive digital function circuitry and having an output connected to said balanced output driver input;
a transmit section including:
transmit digital function circuitry configured to encrypt a serial signal;
a balanced input buffer having an input to receive a balanced digital signal and having an output digital signal;
a line decoder circuit having an input connected to said balanced input buffer output signal and having an output connected to said transmit digital function circuitry;
a transmit amplifier having an input and having an output signal coupled to a transceiver output signal; and
a line encoder circuit having an input connected to said transmit digital function circuitry and having an output connected to said transmit amplifier input; and
a controller having a control communication interface and connected to said receive section and said transmit section, wherein said controller controls said receive and transmit amplifiers and said receive and transmit digital function circuitry;
a processor coupled to said pluggable transceiver; and
software, running on said processor, that causes said processor to provide a key to said pluggable transceiver and to activate encryption and decryption by said pluggable transceiver.

6. The network device of claim 5, wherein said pluggable transceiver further compresses and decompresses serial signals, and
wherein said software further causes said processor to activate compression and decompression by said pluggable transceiver.

7. The network device of claim 6, wherein said pluggable transceiver further monitors bit error rates, and
wherein said software further causes said processor to obtain bit error rate values from said pluggable transceiver and to provide said bit error rate values for use by a user.

8. A method comprising:
providing a pluggable transceiver including:
a receive section including:
receive digital function circuitry configured to decrypt a serial signal;
a receive amplifier having an input coupled to a received signal and having an output digital signal;
a line decoder circuit having an input connected to the receive amplifier output and having an output connected to the receive digital function circuitry;
a balanced output driver having an input and having an output which provides a balanced digital output signal; and
a line encoder circuit having an input connected to the receive digital function circuitry and having an output connected to the balanced output driver input;
a transmit section including:

transmit digital function circuitry configured to encrypt a serial signal;

a balanced input buffer having an input to receive a balanced digital signal and having an output digital signal;

a line decoder circuit having an input connected to the balanced input buffer output signal and having an output connected to the transmit digital function circuitry;

a transmit amplifier having an input and having an output signal coupled to a transceiver output signal; and a line encoder circuit having an input connected to the transmit digital function circuitry and having an output connected to the transmit amplifier input; and a controller having a control communication interface and connected to the receive section and the transmit section, wherein the controller controls the receive and transmit amplifiers and the receive and transmit digital function circuitry;

providing a key to the controller of the pluggable transceiver; and encrypting and decrypting serial signals in the pluggable transceiver.

9. The method of claim 8, further comprising:

compressing and decompressing the serial signals in the pluggable transceiver; and activating the compression and decompression in the pluggable transceiver.

10. The method of claim 9, further comprising:

detecting bit error rates in a serial signal in the pluggable transceiver;

reading said detected bit error rates from the pluggable transceiver; and providing said read, detected bit error rates for use by a user.

* * * * *